Patented June 18, 1935

2,005,619

UNITED STATES PATENT OFFICE 2,005,619

ESTERS OF ACIDS OF PHOSPHORUS

George De Witt Graves, Wilmington, Del., assignor to E. I. du Pont de Nemours & Company, Wilmington, Del., a corporation of Delaware No Drawing. Application November 10, 1934, Serial No. 752,465

22 Claims. (Cl. 260—99.20)

This invention relates to new mixtures of esters and mixed esters of phosphorus acids derived from a-cyclic monohydric alcohols and methods for making the same. By "a-cyclic" is meant an open carbon chain.

Some esters of phosphorus acids derived from aliphatic alcohols and from phenols are known and have been employed in cellulose derivative plastic and coating compositions and as wetting agents, detergents, textile lubricants and the like. Among the known phosphoric esters are those of low molecular weight a-cyclic monohydric alcohols, containing for example five or less carbon atoms. However, such esters do not have a sufficient surface active effect to render them commercially valuable as wetting agents and detergents. The homogeneous phosphoric acid esters of long chain aliphatic alcohols and of phenols e. g. tri o-cresyl phosphate, dilauryl phosphate, and dicetyl phosphate, are also known. Such esters have been limited in application for the reason that they tend to exude from plastic and coating compositions containing them, or they are not sufficiently soluble in water and oils.

An object of the present invention is to provide mixtures of esters and mixed esters of phosphorus acids derived from long chain a-cyclic alcohols which mixed esters are new chemical compounds. A further object is to provide methods for making such new compounds. Still further objects are to provide new compositions of matter and to advance the art. Other objects will appear hereinafter.

These objects may be accomplished in accordance with my invention which comprises making mixtures of neutral and/or acid esters of the acids of phosphorus. The mixtures of esters apparently contain mixed esters each of which contains at least one radical of a primary monohydric a-cyclic alcohol of at least 8 carbon atoms and at least one member of the group comprising phenolic radicals and primary monohydric a-cyclic alcohol radicals different from the first mentioned alcohol radical. In other words, a mixed ester of my invention contains at least two different a-cyclic alcohol radicals or a-cyclic alcohol radicals and phenolic radicals, at least one a-cyclic alcohol radical containing at least 8 carbon atoms and, preferably, between 8 and 18 carbon atoms. The preferred compositions of my invention are the mixture of esters and mixed esters obtainable by reacting an esterifying derivative of orthophosphoric acid with a mixture of alcohols obtainable from the carboxylic reduction of naturally occurring fatty oils such as sperm oil and coconut oil. One method of obtaining such alcohols is disclosed in application Serial No. 584,575 filed January 2, 1932 by Wilbur A. Lazier.

The mixtures of esters and mixed esters of my invention include the esters of orthophosphoric acid, metaphosphoric acid, pyrophosphoric acid, phosphorous acid and hypophosphorous acid. They also include esters of mixtures of the acids of phosphorus.

The compositions of my invention may be prepared by reacting a mixture of a-cyclic alcohols of at least 8 carbon atoms or a mixture of such alcohols containing a phenol or some other a-cyclic alcohol with a phosphorus chloride or anhydride. Such mixture of alcohols must contain at least one molecular proportion of alcohols of at least 8 carbon atoms and at least one molecular proportion of a different alcohol or a phenol for each molecule of the phosphorus compound.

The mixed esters may also be prepared by first preparing an acid ester of an acid of phosphorus with an a-cyclic alcohol or mixture of a-cyclic alcohols and then further reacting the acid ester with other a-cyclic alcohols or phenols. This latter method produces the pure mixed esters, i. e. mixed esters only unmixed with homogeneous esters.

The process of making mixtures of a-cyclic alcohol esters of ortho-phosphoric acid may be carried out by placing a mixture of such alcohols, alone or dissolved in a suitable solvent such as benzene, toluene, chloroform and the like, in an acid-resistant vessel connected with a reflux condenser under reduced pressure. The vessel and its contents is then brought to the desired temperature which may be from about 0° to about 100° C. It will usually be found preferable to employ temperatures of about 0° to about 30° C. Phosphorus oxychloride is then gradually admitted in liquid or vapor form. The bulk of the hydrogen chloride, formed during the addition of the oxychloride, is continuously removed.

When all of the phosphorus oxychloride has been added and the reaction is complete, the mixture is heated under reduced pressure until the hydrogen chloride vapors have almost entirely passed out of the vessel. If desired, the ingredients may be mixed in the cold and the reaction then carried to completion under reduced pressure in a heated vessel. The resulting mixture of phosphates may be purified by distillation under reduced pressure or by recrystallization from a suitable solvent such as benzine, alcohols or mixtures of alcohols with water.

Another procedure consists in reacting one molecular proportion of phosphorus oxychloride with one or two molecular proportions of a mixture of primary a-cyclic alcohols of eight or more carbon atoms, preferably in the cold and in a suitable solvent, and then heating a short time under reduced pressure. The operation is preferably carried out at a temperature of between about 0° to about 30° C. The product will be principally the chlorides of a mixture of monoalkyl phosphates or dialkyl phosphates, depending upon the quantity of the alcohol mixture employed. After removal of the hydrogen chloride, a second alcohol or phenol or mixture of alcohols is added, preferably in excess, and the neutral mixed esters are obtained.

Catalysts such as copper powder or metallic chlorides may be added to the reaction liquid in order to facilitate the splitting off of the hydrogen chloride and to speed up the reaction. The degree of reduced pressure employed may also vary within wide limits.

In place of the phosphorus oxychloride, other phosphorus chlorides or oxides such as phosphorus pentachloride, phosphorus trichloride and phosphorus pentoxide may be employed. When phosphorus pentoxide is employed, the solvent may be ether, pyridine or other tertiary base. With either phosphorus pentachloride or phosphorus pentoxide, the mix may be heated on the water bath. The solvent may be removed by distillation and then the product washed with water and dried by heating under reduced pressure.

Also, the mixed alcohols may be reacted with sodium to produce the alkoxides which may then be reacted with phosphorus oxychloride or phosphorus trichloride.

A further and alternative procedure of making the mixture of esters comprises first preparing the mixed alkyl halides, such as the iodides, and then reacting them with the silver salt of pyrophosphoric, metaphosphoric or orthophosphoric acids to obtain the mixture of neutral or acid alkyl esters, depending upon the proportions employed.

The mixture of esters and the mixed esters of my invention are, in general, liquids or semi-liquids at atmospheric temperatures i. e. about 25° C. This is a surprising result as the corresponding pure homogeneous esters are generally solids at such temperatures. Also, when two or more such homogeneous esters are melted together, the product is solid at such temperatures. For example when equal parts of dilauryl phosphate, having a melting point of 60° C. dicetyl phosphate, having a melting point of 74° C., are fused together, the resulting product has a melting point of about 67-69° C.

The neutral esters may be treated with alkali to produce the alkali salts of the dialkyl phosphates. For example, one part by weight of a mixture of neutral phosphates is boiled with eight parts by weight of sodium hydroxide dissolved in 192 parts by weight of water for two hours. The sodium salts of the dialkyl phosphates are thus obtained. These salts are soluble or dispersible in water. It has been found that the sodium salts of a mixture of dialkyl phosphates can be employed to emulsify an oil or a long chain alcohol in a small amount of water to obtain a thick jelly which can be diluted indefinitely with water.

While the sodium salts of the acid esters of phosphorus acids are soluble in water, the salts obtained with organic bases such as triethanolamine or methyl glucamine, are even more soluble. The neutral esters may also be hydrolyzed by cooking them with acids to yield acids of the mono- and the dialkyl phosphates.

In order to illustrate my invention more clearly and the preferred modes of carrying the same into effect, the following examples are given:

*Example 1*

A mixture of approximately 60% lauryl alcohol and 40% myristyl alcohol, which mixture had an indicated molecular weight of 206 as calculated from an analytical determination of hydroxyl number, was prepared. 247 parts by weight of this mixture was mixed with 300 parts of benzene. 61.4 parts by weight of phosphorous oxychloride was then added slowly. The resulting mixture was placed in a glass vessel attached to a reflux condenser and heated at the reflux temperature under a pressure of 725 mm. for 18 hours. The slight vacuum served to assist in the removal of the hydrogen chloride which was formed. The benzene solution was then washed with warm water until neutral and the benzene evaporated. The determination of the acid number indicated the product to be a mixture of dialkyl acid orthophosphates of lauryl and myristyl alcohols and probably contained substantial amounts of the mixed lauryl, myristyl acid orthophosphate. The product was a liquid which, when neutralized with sodium hydroxide, was soluble in water and formed a stable dispersion.

The product is not completely solid at 15° C. and becomes a liquid when heated to about 30° C. This is surprising as dilauryl phosphate melts at 60° C., dimyristyl phosphate melts at about 67° C. and it was expected that a mixture of approximately equal parts of dilauryl phosphate and dimyristyl phosphate would melt at a temperature above 60° C.

*Example 2*

A mixture of alcohols was obtained by hydrogenation of sperm oil. This mixture had an indicated molecular weight of 272, as calculated from an analytical determination of hydroxyl number, and had approximately the following composition:

Unsaturated alcohols of—

| | Per cent |
|---|---|
| 12 carbon atoms | 0.8 |
| 14 carbon atoms | 6.4 |
| 16 carbon atoms | 21.4 |
| 18 carbon atoms (oleyl) | 34.9 |
| 20 carbon atoms | 12.4 |
| 22 carbon atoms | 0.4 |

Saturated alcohols of—

| | Per cent |
|---|---|
| 10 carbon atoms | 1.0 |
| 12 carbon atoms | 3.7 |
| 14 carbon atoms | 5.9 |
| 16 carbon atoms | 4.9 |
| 18 carbon atoms | 7.2 |
| 20 carbon atoms | 0.7 |

272 parts by weight of the above mixture was mixed with 19 parts by weight of a mixture of approximately 70% lauryl alcohol and 30% myristyl alcohol, which mixture had an indicated molecular weight of 191. The resulting mixture of alcohols was dissolved in 220 parts by weight of benzene. 51 parts by weight of phosphorous oxychloride were added slowly. The solution was heated under a reflux condenser for 17 hours at a temperature of about 80° C. The reaction mixture was then washed with warm water.

After evaporation of the benzene, a light yellow colored liquid was obtained. This product appeared to be a mixture of esters of orthophosphoric acid including substantial amounts of the mixed esters.

*Example 3*

500 parts by weight of a mixture of octyl, decyl, and lauryl alcohol was placed in a vessel resistant to hydrochloric acid, along with 500 parts by weight of benzene, and cooled to between 0° and 20° C. 243.5 parts of phosphorus oxychloride was added slowly with agitation. During the addition of the phosphorus oxychloride, the temperature was maintained at or below 20° C. After the addition of the phosphorus oxychloride, the mixture was agitated at about 20° C. for 2 hours. The mixture was then washed with cold water until it was free from chlorides. The resulting solution was separated from the water, dried and the benzene evaporated off. The final product was a slightly yellowish oil containing approximately 95% of a mixture of dialkyl phosphates containing a substantial proportion of mixed dialkyl phosphates. This product may be decolorized by treating with charcoal and filtering.

The alcohol mixture of the above example was a mixture of primary aliphatic alcohols having an average molecular weight of about 157.5 and containing n-octyl, n-decyl and lauryl alcohols. It was obtained by the fractionation of the alcohol mixture obtained by the hydrogenation of coconut oil or oil acids by the process of Lazier, Serial Number 584,575, filed January 2, 1932.

*Example 4*

Coconut oil was hydrogenated by the process disclosed in application Serial Number 584,575, filed January 2, 1932 by Wilbur A. Lazier, and the product washed with water to remove water soluble products. The resulting product had an average molecular weight of approximately 190 and was a mixture of primary monohydric aliphatic alcohols containing approximately 2% hexyl alcohol, 9% octyl alcohol, 10% decyl alcohol, 45% lauryl alcohol, 20% myristyl alcohol, 7% cetyl alcohol, 5% stearyl alcohol and 2% oleyl alcohol. 519 parts by weight of this mixture was dissolved in 750 parts by weight of benzene. 459 parts by weight of phosphorus oxychloride was added slowly, maintaining the temperature at about 25° to 30° C. by cooling. The mixture was allowed to react for five hours under a sufficient vacuum to cause the benzene to reflux at the temperature of 25-30° C. The solution was then washed with water and the benzene evaporated. A light colored oil remained. This product is a mixture of alkyl phosphates containing a substantial proportion of mixed phosphates in which the alkyl group has an even number of carbon atoms in the range 6–18 inclusive.

*Example 5*

The alcohol mixture used in Example 4 may also be used in Example 3 with the slight variations in proportion of POCl3 to mixed alcohols which is necessary to take care of the slightly different average molecular weight of the latter. A product consisting of a mixture of alkyl phosphates, the alkyl radicals having an even number of carbons in the range 6–18 inclusive, is obtained.

*Example 6*

186 parts by weight of lauryl alcohol was dissolved in 220 parts by weight of benzene. 296 parts by weight of dicresyl phosphoryl chloride was added to the solution. The solution was then refluxed for 17 hours at about 80° C., after which it was washed with warm water until neutral. Evaporation of the solvent left a light yellow colored oil which analysis for phosphorus indicated to be the neutral dicresyl lauryl phosphate.

The above examples are merely illustrative of my invention. Other new mixed esters of the acids of phosphorus which may be prepared are:

Acid octyl, decyl ortho-phosphate
Acid hexyl, stearyl ortho-phosphate
Acid lauryl, phenyl ortho-phosphate
Acid oleyl, cresyl ortho-phosphate
Neutral hexyl, lauryl, stearyl ortho-phosphate
Neutral dilauryl, ethyl ortho-phosphate
Neutral myristyl, octyl, cresyl ortho-phosphate
Neutral butyl, nonyl, oleyl ortho-phosphate
Neutral di-eleostearyl, decyl ortho-phosphate
Neutral diricinoleyl, decyl ortho-phosphate
Neutral octyl, lauryl, stearyl phosphite
Neutral lauryl, myristyl, hypophosphite
Acid undecyl, myristyl, heptadecyl pyrophosphate
Mixed esters of meta-phosphoric acid derived from a mixture of alcohols obtained from coconut oil and composed essentially of octyl, decyl, lauryl, myristyl and cetyl alcohols.

In the compounds listed above, the term "ricinoleyl" represents the radical of ricinoleyl alcohol obtained from castor oil by sodium reduction. The term "eleostearyl" represents the radical of eleostearyl alcohol which is obtained by sodium reduction of China-wood oil.

Many other compounds, similar to those heretofore mentioned, will be apparent to those skilled in the art.

The mixture of esters and mixed esters of my invention are valuable materials which may be employed as plasticizers for plastic and coating compositions and particularly for such compositions containing cellulose ethers and esters to be used on wood, metal, cloth, or paper. They have many advantages over prior phosphate esters in that they do not tend to exude from such plastic and coating compositions and are also more soluble in such compositions. They also have fire-retarding properties.

The acid esters and their alkali, ammonia and amine salts are useful as wetting agents, detergents, textile lubricants and the like. They have many advantages over other acid phosphates heretofore known as they are more soluble in water and oils, and have a marked surface active effect. For example, sodium ethyl lauryl phosphate is more soluble in water than sodium dilauryl phosphate.

Also, the acid phosphates, when added to lubricating oils, maintain an effective lubricating action at excessive pressures. The mixture of esters and the mixed phosphates, such as oleyl lauryl phosphate, are more soluble in the lubricating oils than the pure homogeneous phosphates, such as dilauryl phosphate and dioleyl phosphate and are hence more effective.

The cobalt and manganese salts of the acid phosphates of my invention are catalysts for the oxidation of drying oils. Also, the iron, nickel, cobalt and manganese salts of my acid phosphates retard the absorption of ultra-violet light by nitrocellulose films. The lead salts of the acid phosphates of my invention are useful in pharmaceutical preparations.

This application is a continuation in part of the co-pending application of Bousquet, Graves and Salzberg, Serial No. 649,448 filed December 29, 1932.

While I have disclosed the preferred embodiments of my invention and indicated some of the variations and modifications which may be made therein, it will be readily apparent to those skilled in the art that many other variations and modifications may be made therein without departing from the spirit of my invention. Accordingly, the scope of my invention is to be limited solely by the appended claims construed as broadly as is permissible in view of the prior art.

I claim:

1. A mixture of esters of an acid of phosphorus obtainable by reacting one molecular proportion of an esterifying derivative of an acid of phosphorus with a mixture of alcohols containing at least one molecular proportion of primary monohydric a-cyclic alcohols of at least 8 carbon atoms and at least one molecular proportion of at least one member of the group consisting of phenols and primary monohydric a-cyclic alcohols different from one of the first mentioned alcohols.

2. A mixture of esters of an acid of phosphorus obtainable by reacting one molecular proportion of an esterifying derivative of an acid of phosphorus with at least two molecular proportions of a mixture of primary monohydric a-cyclic alcohols obtainable by the carboxylic reduction of a naturally occurring fatty oil.

3. A mixture of esters of an acid of phosphorus obtainable by reacting one molecular proportion of an esterifying derivative of an acid of phosphorus with at least two molecular proportions of a mixture of primary monohydric a-cyclic alcohols obtainable by the carboxylic reduction of coconut oil.

4. A mixture of esters of an acid of phosphorus obtainable by reacting one molecular proportion of an esterifying derivative of ortho-phosphoric acid with a mixture of alcohols containing at least one molecular proportion of primary monohydric a-cyclic alcohols of at least 8 carbon atoms and at least one molecular proportion of at least one member of the group consisting of phenols and primary monohydric a-cyclic alcohols different from one of the first mentioned alcohols.

5. A mixture of esters of an acid of phosphorus obtainable by reacting one molecular proportion of an esterifying derivative of ortho-phosphoric acid with at least two molecular proportions of a mixture of primary monohydric a-cyclic alcohols obtainable by the carboxylic reduction of a naturally occurring fatty oil.

6. A mixture of esters of an acid of phosphorus obtainable by reacting one molecular proportion of an esterifying derivative of ortho-phosporic acid with at least two molecular proportions of a mixture of primary monohydric a-cyclic alcohols obtainable by the carboxylic reduction of coconut oil.

7. Mixed esters of an acid of phosphorus, each ester containing at least one radical of a primary monohydric a-cyclic alcohol of at least 8 carbon atoms and at least one member of the group consisting of phenolic radicals and primary monohydric a-cyclic alcohol radicals different from the first mentioned alcohol radical.

8. Neutral mixed esters of an acid of phosphorus, each ester containing at least one radical of a primary monohydric a-cyclic alcohol of at least 8 carbon atoms and at least one member of the group consisting of phenolic radicals and primary monohydric a-cyclic alcohol radicals different from the first mentioned alcohol radical.

9. Mixed esters of ortho-phosphoric acid, each ester containing at least one radical of a primary monohydric a-cyclic alcohol of at least 8 carbon atoms and at least one member of the group consisting of phenolic radicals and primary monohydric a-cyclic alcohol radicals different from the first mentioned alcohol radical.

10. Neutral mixed esters of ortho-phosphoric acid, each ester containing at least one radical of a primary monohydric a-cyclic alcohol of at least 8 carbon atoms and at least one member of the group consisting of phenolic radicals and primary monohydric a-cyclic alcohol radicals different from the first mentioned alcohol radical.

11. Mixed esters of ortho-phosphoric acid, each ester containing at least one radical of a primary monohydric a-cyclic alcohol of 8 to 18 carbon atoms and at least one member of the group consisting of phenolic radicals and primary monohydric a-cyclic alcohol radicals different from the first mentioned alcohol radical.

12. Neutral mixed esters of ortho-phosphoric acid, each ester containing at least one radical of a primary monohydric a-cyclic alcohol of 8 to 18 carbon atoms and at least one member of the group consisting of phenolic radicals and primary monohydric a-cyclic alcohol radicals different from the first mentioned alcohol radical.

13. A mixture of mixed esters of an acid of phosphorus, each ester containing at least one radical of a primary monohydric a-cyclic alcohol of at least 8 carbon atoms and at least one radical of a different primary monohydric a-cyclic alcohol.

14. A mixture of neutral mixed esters of an acid of phosphorus, each ester containing at least one radical of a primary monohydric a-cyclic alcohol of at least 8 carbon atoms and at least one radical of a different primary monohydric a-cyclic alcohol.

15. A mixture of mixed esters of ortho-phosphoric acid, each ester containing at least one radical of a primary monohydric a-cyclic alcohol of 8 to 18 carbon atoms and at least one radical of a different primary monohydric a-cyclic alcohol.

16. A mixture of neutral mixed esters of ortho-phosphoric acid, each ester containing at least one radical of a primary monohydric a-cyclic alcohol of 8 to 18 carbon atoms and at least one radical of a different primary monohydric a-cyclic alcohol.

17. The method of making mixtures of esters of an acid of phosphorus which comprises reacting a mixture of primary monohydric a-cyclic alcohols with one molecular proportion of an esterifying derivative of an acid of phosphorus, said mixture of alcohols containing at least one molecular proportion of a-cyclic alcohols of at least 8 carbon atoms and at least one molecular proportion of a different a-cyclic monohydric alcohol.

18. The method of making mixed esters of an acid of phosphorus which comprises reacting one molecular proportion of an esterifying derivative of an acid of phosphorus with from 1 to 2 molecular proportions of at least one member of the group consisting of phenols and primary monohydric a-cyclic alcohols, and then reacting the resulting product with at least one molecular proportion of a member of the group consisting of primary monohydric alcohols of at least 8 carbon atoms and mixtures of such alcohols.

19. A mixture of esters of ortho-phosphoric acid obtainable by reacting one molecular proportion of an esterifying derivative of ortho-phosphoric acid with about two molecular proportions of a mixture of alcohols consisting substantially entirely of n-octyl, n-decyl and lauryl alcohols.

20. Dicresyl lauryl othro-phosphate.

21. A mixture of esters of ortho-phosphoric acid obtainable by reacting one molecular proportion of an esterifying derivative of ortho-phosphoric acid with at least two molecular proportions of a mixture of primary monohydric a-cyclic alcohols obtainable by the hydrogenation of sperm oil.

22. A mixture of esters of ortho-phosphoric acid obtainable by reacting one molecular proportion of an esterifying derivative of ortho-phosphoric acid with at least two molecular proportions of a mixture of alcohols of which the greater proportion consists of a mixture of primary monohydric a-cyclic unsaturated alcohols of 16, 18 and 20 carbon atoms.

GEORGE DE WITT GRAVES.